United States Patent Office 2,751,359
Patented June 19, 1956

2,751,359
BASIC ALUMINUM ALKANOATE GELLING AGENTS

Philip Hill, Lansing, Ill., Richard E. Van Strien, Griffith, Ind., and Philip H. Towle, Chicago, Ill., assignors to Standard Oil Company, Chicago, Ill., a corporation of Indiana No Drawing. Application September 22, 1954, Serial No. 457,772

10 Claims. (Cl. 252—316)

This is a continuation-in-part of our application entitled "Aluminum Octanoate Gelling Agents," Serial No. 401,398, filed December 30, 1953, now abandoned.

This invention relates to the preparation and use of bodying agents for normally liquid light hydrocarbons and mixtures thereof, such as motor gasoline, aviation gasoline, kerosene, jet fuels, and diesel fuels. More particularly, the invention concerns the production and use of novel combinations of basic aluminum alkanoates as bodying agents in preparing gelled light hydrocarbon liquids useful as charges for incendiary bombs, grenades, flame throwers, land mines, and the like. The improved hydrocarbon gel compositions may also be used as hydraulic fracturing media for producing channels in earth formations to increase the productivity of fluids from strata traversed by an oil or gas well as described, for example, in the Oil and Gas Journal, vol. 47, No. 24 (October 14, 1948), pages 76 et seq., and in U. S. Patents 2,596,843–4.

It is an object of this invention to produce gels of normally liquid hydrocarbons for use as military incendiaries. Another object is to reduce the gelation time of such basic aluminum branched chain alkanoates as basic aluminum 2-ethylhexanoate and basic aluminum 3,5,5-trimethylhexanoate, the alkanoate radicals of which are saturated with respect to carbon to carbon linkage in said alkanoate radicals. Still another object of this invention is to provide gelling agents affording blends of branched chain alkanoate radicals with saturated straight chain alkanoate radicals and thereby obtain with such blends the cooperative desirable gelation properties of the gelling agents having alkanoate radicals of different carbon chain configuration in such basic aluminum soap blend. A further object of the invention is to produce hydraulic fracturing gelled hydrocarbons from normally liquid hydrocarbons and gelling agents consisting essentially of mixtures of basic aluminum branched chain alkanoates with basic aluminum straight chain alkanoates, the carbon chains of which are saturated hydrocarbon chains. Other objects of the invention will appear from the description of the invention set forth below.

Our gelling agents are essentially mixtures of basic aluminum alkanoate soaps, the alkanoate radicals of which contain 8 to 13 carbon atoms per alkanoate radical. The alkanoate radicals of the mixture of basic aluminum alkanoate soaps consist of not less than about 5% and not more than 70%, preferably from about 5% to about 50%, of alkanoate radicals of straight carbon chain saturated fatty acids having from 8 to 13 carbon atoms, that is, n-octanoate radicals through n-tridecanoate radicals. The branched chain alkanoate radicals which make up the remainder of the alkanoate radicals in the mixture of basic aluminum alkanoate soaps also contain from 8 to 13 carbon atoms. These branched chain radicals contain at least one branch and the branch or branches are selected from the class consisting of methyl, ethyl, and propyl.

The straight chain alkanoate radicals contain from 8 to 13 carbon atoms. In other words, the straight chain alkanoate radicals are selected from the class consisting of n-octanoate, n-nonanoate, n-decanoate, n-undecanoate, n-dodecanoate, and n-tridecanoate.

The branched chain alkanoates of this invention contain from 8 to 13 carbon atoms and have at least one branch selected from the class consisting of methyl, ethyl, and propyl. Hereinafter, the branched chain alkanoate radicals are designed according to the Geneva system of nomenclature wherein the carboxyl carbon is the number one carbon atom in the longest straight carbon chain and the branch(es) is (are) attached to the number two carbon atom or to a higher number carbon atom.

In order to obtain the gelling agent of this invention, the branched chain alkanoate radicals may be (1) a single radical of a particular carbon chain configuration, (2) two or more radicals having the same number of carbon atoms but of different carbon chain configurations, or (3) two or more radicals having different number of carbon atoms.

Essentially, the gelling agent of the invention consists of basic aluminum alkanoate. The basic aluminum alkanoate contains, on the average, per atom of aluminum, about one hydroxyl radical (OH⁻), and about two alkanoate radicals. The gelling agent may consist of a physical mixture of two or more basic aluminum alkanoates or, a chemical mixture obtained by the coprecipitation method. The gelling agent may contain several different basic aluminum alkanoates; representations of three possible structural configurations are set out below. In these representations, RCOO designates a straight chain alkanoate radical as defined above, and R'COO designates a branched chain alkanoate radical as defined above.

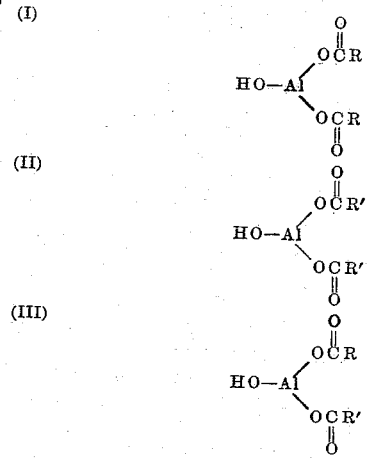

It is to be understood that the above represent empirically the aluminum soap which, it is believed, exists in the gelling agent as polymers.

Representation I shows a basic aluminum soap containing only straight chain alkanoate radicals. Representation II shows a basic aluminum soap containing only branched chain alkanoate radicals. A gelling agent suitable for the purposes of this invention may be made by physically mixing a particular basic aluminum soap or mixture of basic aluminum soaps of type I with a basic aluminum soap or mixture of basic aluminum soaps of type II, in relative amounts hereinafter set forth.

More commonly, the basic aluminum soap is prepared by coprecipitation wherein a solution of alkali metal soaps of the straight chain alkanoates and branched chain alkanoates is reacted with inorganic aluminum salt to precipitate the basic aluminum soaps. This technique, which is known as "coprecipitation" or "wet method," results in the presence of basic aluminum soaps of each of the three types shown above. Thus, in addition to soaps containing only straight chain alkanoate radicals or only branched chain alkanoate radicals, there exists a soap containing both a straight chain alkanoate radical and a branched chain alkanoate radical (Representation III).

It is to be understood that when more than one straight chain alkanoate radical and/or more than one branched chain alkanoate radical is present in the solution charged to coprecipitation there are produced basic aluminum soaps containing two different straight chain alkanoate radicals and also soaps containing two different branched chain alkanoate radicals.

In order to obtain the desired charactistics of the gelled hydrocarbon, it is necessary that a definite relation exists in the gelling agent between the straight chain alkanoate radicals present and the branched chain alkanoate radicals present. The relative proportion of straight chain alkanoate radicals to branched chain alkanoate radicals present in the gelling agent will be determined mainly by the particular type or types of alkanoate radicals utilized and by the desired characteristics of the gelled hydrocarbon. Within limits the characteristics of the gelled hydrocarbon can be tailor-made by choosing the type of alkanoate radicals and by the relative proportion of branched chain radicals to straight chain radicals.

Generally, in the basic aluminum soap component of the gelling agent the straight chain alkanoate radicals are between about 5 mole percent and about 70 mole percent of the total alkanoate radicals and the remainder of the total alkanoate radicals are branched chain alkanoate radicals, that is, between 95 mole percent and 30 mole percent of the total alkanoate radicals are branched chain radicals. This distribution of alkanoate radicals is readily obtained in coprecipitation by suitably controlling the amount of the particular alkali metal soap added to the coprecipation solution. When the gelling agent is formed by a physical mixture of branched chain basic aluminum soap and straight chain basic aluminum soap, the relative weights of the two soaps should be adjusted to bring the total alkanoate radical content within the above defined molar proportions. More commonly, the straight chain alkanoate radical content of the gelling agent is held at not more than about 50 mole percent of the total alkanoate radicals. It is to be understood that the relative proportion of straight chain alkanoate radicals may be less than the upper limit set out above as determined not only by the characteristics of the particular alkanoate radicals but also by the desired properties of the gelled hydrocarbon.

The gelling agent of this invention may consist entirely of defined basic aluminum alkanoate or it may consist essentially of defined basic aluminum alkanoate. In addition to the soap, the agent may contain from about 1% by weight to about 5% of an antiagglomerant and also minor amounts of a peptizing material, such as a free fatty acid. Usually, the antiagglomerant is added to the partially dried soap as an aid in the comminution of the soap. Examples of these antiagglomerants are diatomaceous earth, methyl cellulose, and aerogels. A particularly suitable antigglomerant is the silica aerogel sold under the name Santocel.

The gelling agent of this invention is utilized to gel normally liquid hydrocarbons, preferably petroleum distillates. The normally liquid hydrocarbons that are suitable for the preparation of a gelled hydrocarbon boil between about 100° F. and about 600° F. according to the ASTM distillation procedure. Examples of these normally liquid hydrocarbons are naptha, clear gasoline, leaded gasoline (motor and aviation), kerosene, jet fuel, diesel fuel, and heater oil. The gelling agent is particularly suitable for the gelling of leaded gasoline and jet fuel.

The gelled hydrocarbon of this invention is prepared by incorporating the gelling agent into a normally liquid hydrocarbon. The amount of gelling agent will vary depending on the consistency of the gel desired, the composition of the gelling agent, and the type of normally liquid hydrocarbon to be gelled. Generally, suitable gels are obtained at concentrations of from about 2% to about 10% by weight based on the gelled hydrocarbon. For most military uses, the gelled hydrocarbon will contain from about 3% to about 7% by weight of the gelling agent.

Various gelling agents were prepared and these were utilized in the gelling of different hydrocarbons in order to illustrate the gelling agents of the invention and the mode of use thereof. It is to be understood that the examples of agents and gelled hydrocarbons are illustrative only and do not limit the scope of the invention.

AGENTS CONTAINING 2-ETHYLHEXANOATE RADICALS

In the preparation of basic aluminum octanoate soap by the coprecipitation method, 80 grams of sodium hydroxide were dissolved in 2000 grams of water. To this caustic solution was added 100 grams of 2-ethylhexanoic acid and 100 grams of caprylic acid. The amount of sodium hydroxide present in the solution was sufficient to provide the required sodium to form the sodium octanoates and in addition sufficient to provide one hydroxyl radical for each two octanoate radicals in the solution. An aqueous solution of aluminum chloride prepared by mixing 330 ml. 32° Bé. aluminum chloride solution with 340 ml. of water was added to the aqueous solution containing sodium 2-ethylhexanoate and sodium caprylate. The precipitate of basic aluminum 2-ethylhexanoate-caprylate was water washed free of inorganic salts and dried for 24 hours at 140° F. to 180° F. The dried aluminum soap was then ground in a micro-pulverizer to a size such that about 75% passed through a 100 mesh screen and none was retained on a 40 mesh screen. The grinding was carried out in the presence of 2% by weight of Santocel. (Experiments have been carried out which show that the presence of Santocel has no beneficial or adverse effect on the gelling properties of the soaps.)

When it was desired to use physical mixtures of the basic aluminum 2-ethylhexanoate and basic aluminum caprylate gelling agent compounds, the basic aluminum 2-ethylhexanoate and basic aluminum caprylate were prepared separately according to the procedure described above.

In using the gelling agents produced according to the foregoing procedure, a quantity of the agent is added to the hydrocarbon fuel and stirred at ambient temperature. When physical mixtures of the basic aluminum 2-ethylhexanoate with basic aluminum caprylate are used the powdered components are mixed thoroughly in the desired proportions prior to addition to the hydrocarbon. The coprecipitated gelling agent is particularly effective for the gelation of gasolines, jet fuels and the like to relatively high gel viscosity in a short period of time when used at low concentrations, that is, at concentrations within the range of from about 2 percent to about 6 percent based on the total weight of the gelled incendiary.

Gelation begins immediately when the agent and hydrocarbon liquid are stirred at ambient temperatures. The extent of initial gelation is a measure of the gelling properties and is determined by a standard test described hereinafter as the "Vortex Time," that is, the time necessary to obtain a specific diminution of the amplitude of a vortex in a mass stirred under defined conditions. This "Vortex Time" is a measure of the rate at which a gelling agent causes a hydrocarbon solvent to thicken. A Vortex Time of about 10 minutes or less, in the production of gels having the higher consistency range described hereinbelow, is desired. Our coprecipitated aluminum 2-ethylhexanoate-caprylate gelling agent shows a Vortex Time of about 2 minutes at 4 percent concentration in the gelation of gasolines to form relatively stable, moisture insensitive gels.

For general laboratory testing of gelling agents a quantity of the hydrocarbon solvent is introduced into a square-type pint Mason jar having dimensions approximately 3 inches by 3 inches by 5 inches deep. A total weight of 200 grams of solvent and gelling agent is employed. For example, if 4 weight percent gel is to be prepared, 8 grams of the gelling agent will be added to 192 grams of the solvent.

A glass stirring rod is employed which is about 3/8 inch in diameter with four vanes, 7/8 by 7/8 by 1/8 inch, set at right angles and having faces parallel to the axis of the rod. The stirrer is mounted within the jar with the bottom of the stirrer 1/2 inch above the bottom of the jar. A reference mark is made on the glass rod one centimeter below the surface of the test solvent.

The stirring speed is adjusted to 300±10 R. P. M. and the temperature of the solution is controlled at some standardized temperature. Evaluations shown in Tables 1 and 2 were carried out at 77° F. The time elapsed between addition of the gelling agent sample and immersion of the reference mark by the rising vortex is recorded as the "Vortex Time." The gel continues to cure for from 6 hours to about a day without stirring after the initial gelation occurs, as measured by the "Vortex Time."

The properties of the final gel are measured by the "Gardner Load," which is a measure of the viscosity and indicates the consistency, and when the "Gardner Load" values are determined at time intervals following initial gelation the values obtained indicate the stability of the cured hydrocarbon gel with respect to consistency. It is determined in a Gardner Mobilometer, an apparatus described in "Physical and Chemical Examination of Paints, Varnishes, Lacquers and Colors," 10th edition (May 1946) by Henry A. Gardner and G. G. Sward, distributed by Henry A. Gardner Laboratory, Inc., Bethesda, Maryland. The test is ordinarily made at 24 or 48 hours after initial gelling has taken place and the values are in terms of grams per 100 seconds. Values at the end of 168 hours are substituted for the 48-hour evaluation in Tables 1 and 2 in order to determine the stability of the gels and the effect of humidified air on the gelling agents as reflected in the stability of the gels produced therefrom. In general, a Gardner Load in the range of about 100 to about 225 grams designates a desirable consistency for portable flame thrower service whereas a load of about 350 to about 650 grams indicates a suitable consistency for other military incendiary purposes. Ordinarily, the load should remain below about 650 grams if the gel is to have the desired splattering, cohesion, and burning properties.

The instrument used in our Gardner tests consists essentially of a cylinder supported on a base plate, a plunger or piston, and a collar to support the plunger. The cylinder is 8.0 inches deep and 1.538 inches in diameter. The plunger consists of a disc 1.500 inches in diameter with four perforations 0.250 inch in diameter and a weight pan or holder supported by the upper end of a tube or rod fixed at its lower end to the disc. The weight of the moving system which includes the disc, connecting rod or tube, and the weight support is 100 grams.

To make the test, the cylinder is filled to a depth of 20 centimeters with the gel to be tested and is leveled by means of adjusting screws. The disc end of the plunger is then introduced into the cylinder with the connection tube aligned by a collar. The time required for 2 marks 10 centimeters apart on the stem of the plunger to pass through the collar is then recorded. The pair of marks are located so that they pass through the collar on the bracket as the disc passes through the mid-portion of the cylinder. Thus the plunger is in motion both at the beginning and at the end of the test interval. In reporting results, the "Gardner Load" is determined by noting 2 successive loads in grams corresponding to more than and less than 100 seconds' travel, the load required to give a time fall of 100 seconds being obtained by linear interpolation from these 2 readings.

The formulation of the Standard Test Solvent used in evaluating the gelling agents conforms to Military Standard MS-602 (October 22, 1951) and has the following composition:

| | Weight percent |
|---|---|
| N-heptane | 57 |
| Benzene | 18 |
| Cyclohexane | 20 |
| Isooctane | 5 |

The performance of gelling agents prepared by the coprecipitation of basic aluminum soaps from aqueous solutions containing sodium 2-ethylhexanoate and sodium caprylate in different ratios, using Standard Test Solvent as the hydrocarbon undergoing gelation, is shown in Table 1. There are also incorporated in the table data showing the effect on the gelling properties of the soaps when the dry soap is subjected in shallow layers to atmospheric conditions of 80 percent relative humidity at 80° F. for a period of one-quarter hour.

Referring to Table 1, a precipitated soap containing only aluminum 2-ethylhexanoate at 2 percent concentration in Test Solvent requires more than two hours to initiate gelation and the consistency of the gel produced at this concentration was too thin to measure at the end of a 24-hour period. The low Gardner number at the end of 168 hours indicates incomplete curing of the gelled hydrocarbon even after a week aging period. This is also indicated at the 4 percent concentration level since the gel showed a Gardner Load considerably less than the 500 g./100 second level, for example, as is shown for the gel produced by the 80 percent 2-ethylhexanoate-20 percent caprylate coprecipitated soap. At this ratio of 2-ethylhexanoate to caprylate radicals some improvement in the Vortex Time at both 2 and 4 percent concentrations is noted and the improvement in Vortex Time continues up to the 20 percent 2-ethylhexanoate-80 percent caprylate ratio. However, the effect of moisture sensitivity on the gelling properties of gelling agents containing high caprylate radical content becomes evident at the 30 percent 2-ethylhexanoate-70 percent caprylate ratio, particularly at the 2 percent concentration level. It is noteworthy that at this ratio and concentration level the Gardner Load of the gel produced from the humid atmosphere-exposed gelling agent is measurable at 35 grams per 100 seconds at the end of 168 hours indicating that the gel had cured and stabilized at this low consistency.

TABLE 1

*Performance of coprecipitated aluminum soaps of 2-ethylhexanoic acid and caprylic acid in standard test solvent*

| | 100% 2-Ethylhexanoate, 0% Caprylate | | 80% 2-Ethylhexanoate, 20% Caprylate | | 50% 2-Ethylhexanoate, 50% Caprylate | | 30% 2-Ethylhexanoate, 70% Caprylate | | 20% 2-Ethylhexanoate, 80% Caprylate | | 100% Caprylate, 0% 2-Ethylhexanoate | |
|---|---|---|---|---|---|---|---|---|---|---|---|---|
| Exposure to 80% Rel. Humidity at 80° F., hrs. | 0 | 1/4 | 0 | 1/4 | 0 | 1/4 | 0 | 1/4 | 0 | 1/4 | 0 | 1/4 |
| Moisture in soap, wt. percent | 0.5 | 0.9 | 0.3 | 1.0 | 0.8 | 1.1 | 0.8 | 1.0 | 0.5 | 1.3 | 0.4 | 1.3 |
| 2% Gels: | | | | | | | | | | | | |
| Vortex Time, min | >120 | >120 | 60 | 43 | 12.3 | 13.6 | 8.2 | 4.3 | 1.4 | 2.9 | 30 | 29 |
| Gardner Load, g./100 sec.— | | | | | | | | | | | | |
| at 24 hrs | (a) | (a) | 185 | 190 | 260 | 210 | 180 | 45 | 80 | (a) | 50 | (a) |
| at 168 hrs | 115 | 105 | 220 | 220 | 250 | 185 | 185 | 35 | 70 | (a) | (a) | (a) |
| 4% Gels: | | | | | | | | | | | | |
| Vortex Time, min | 14 | 15 | 5.1 | 3.7 | 4.8 | 5.0 | 2.3 | 1.2 | 0.6 | 1.8 | 2.0 | 4.1 |
| Gardner Load, g./100 sec.— | | | | | | | | | | | | |
| at 24 hrs | 270 | 320 | 550 | 510 | 530 | 510 | 470 | 330 | 410 | 235 | 480 | 335 |
| at 168 hrs | 410 | 430 | 505 | 495 | 520 | 475 | 475 | 295 | 415 | 310 | 445 | 295 | a Too thin to measure.

In Table 2 the performance of a gelling agent prepared by precipitating the basic aluminum soap from an aqueous solution containing equal amounts of sodium 2-ethylhexanoate and sodium caprylate, as described above, is compared with a 50 percent—50 percent physical mixture blend of dry aluminum 2-ethylhexanoate with dry aluminum caprylate, the comparison being made in gelling the test solvent, all-purpose 80 octane number gasoline and standard jet fuel, JP-4.

The gasoline used for the gelling experiments in Table 2 is an 80 octane number all-purpose gasoline meeting U. S. Government Specification MIL-G-3056. The specific sample used in Table 2 had the following properties:

Gravity (A. P. I.), 60.3
Doctor-Sweet
Sulfur—Percent (A. S. T. M.), .065
Copper strip corrosion (8 hours at 122° F.), 0
A. S. T. M. gum (D-381), 1.1 mg./100 cc.
Reid vapor pressure, 6.7 pounds
Oxidation stability, A. S. T. M. (D-525), 480+
Lead content (cc./gallon), 2.70
Octane number (motor), 81.2
A. S. T. M. Distillation:
    Initial, 112° F.
    10% evaporated, 148° F.
    50% evaporated, 224° F.
    90% evaporated, 301° F.
    End point, 382° F.
Metal Deactivator 1.8 lbs./1000 barrels.

The jet fuel, JP-4, used for the gelling experiments in Table 2 met Specification MIL-F-5624A. These specifications are:

Accelerated gum, mg. per 100 ml., not more than 20.0
Aromatics, vol. percent, not more than 25
Bromine No., not more than 30
Corrosion, air-well, not more than 2 ICCS
Distillation:
    10% evaporated, not more than 250° F.
    Endpoint, not more than 550° F.
Freezing point, not more than −76° F.
Gravity A. P. I., 40–58
Heat of combustion (net), B. t. u./lb., not less than 18,400
Reid vapor pressure, 2.0–3.0 pounds
Gum residue (air jet, 392°–410°), not more than 10.0
Sulfur, percent weight, not more than 0.4
Water tolerance—Substantially immiscible in water.

The coprecipitated basic aluminum soap shows properties for the gelling of test solvent, gasoline, and jet fuel with respect to consistency, that is, Gardner Load, superior to the physically mixed octanoates, producing not only higher viscosity gels at the end of 24 hours and 168 hours but the gels were cured to stable gels at the end of the 24-hour period. The Vortex Time for gels prepared by the use of the two types of aluminum octanoates were of the same order of magnitude except that the coprecipitated gelling agent is superior to the physically blended gelling agent for the rapid gelation of jet fuel. However, the physically blended basic aluminum 2-ethylhexanoate—basic aluminum caprylate gelling agent is superior to either component when used alone as gelling agent as shown by performance figures in Table 2 compared with data in Table 1.

TABLE 2

Performance of coprecipitated basic aluminum 2-ethylhexanoate-caprylate versus performance of physically blended 50% basic aluminum 2-ethylhexanoate with 50% basic aluminum caprylate

| Solvent | Test Solvent | | Gasoline | | Jet Fuel (JP-4) | |
|---|---|---|---|---|---|---|
| Type of Soap Blend | Coprecipitated [1] | Physical blend | Coprecipitated [1] | Physical blend | Coprecipitated [1] | Physical blend |
| Moisture in Soap, wt. percent | 0.8 | 0.7 | 0.8 | 0.7 | 0.8 | 0.7 |
| At 2%: | | | | | | |
|   Vortex Time, min | 12.3 | 4.3 | 4.8 | 4.4 | 7.2 | 30.6 |
|   Gardner Load, g./100 sec.— | | | | | | |
|     at 24 hrs | 260 | 125 | 280 | 190 | 310 | 235 |
|     at 168 hrs | 250 | 170 | 250 | 165 | 265 | 220 |
| At 4%: | | | | | | |
|   Vortex Time, min | 1.7 | 0.8 | 1.0 | 2.3 | 1.4 | 10.6 |
|   Gardner Load, g./100 sec.— | | | | | | |
|     at 24 hrs | 530 | 430 | 650 | 440 | 640 | 530 |
|     at 168 hrs | 520 | 510 | 600 | 500 | 600 | 480 |

[1] Coprecipitated aluminum soaps containing 50% 2-ethylhexanoate radicals and 50% caprylate radicals.

The above data indicate that our improved basic aluminum octanoate soaps containing 2-ethylhexanoate radicals in close association with caprylate radicals are effective as gelling agents for the rapid gelation of normally liquid light hydrocarbons to produce rapidly curing, stable gels when used at concentrations of from about 2 percent to about 10.0 percent based on total weight of the gelled hydrocarbon.

In the preparation of the agents, commercial grades of 2-ethylhexanoic acids, caprylic acid, and pelargonic acid were used. The lauric acid was that sold as NeoFat-11 which contains 90% of lauric acid, 9% of myristic acid, and 1% of other acids.

In Table 3 is shown the performance of coprecipitated aluminum soaps of 2-ethylhexanoic acid and lauric acid in Standard Test Solvent at 77° F. In preparing these samples, relative amounts of the acids were chosen such that the sodium alkanoate solutions contain, respectively, 80% 2-ethylhexanoate radicals and 20% laurate radicals, 50% 2-ethylhexanoate radicals and 50% laurate radicals, and 20% 2-ethylhexanoate radicals with 80% laurate radicals. Also in Table 3 the performance of basic aluminum 2-ethylhexanoate gelling agent containing no laurate radicals in the gelling agent is included for purpose of comparison with the gelling agent containing the radicals of different carbon chain structure. Basic aluminum laurate in a concentration of 4% in test solvent when stirred under the conditions of the Vortex Time technique at 77° F. did not give a sufficient diminution of the amplitude of the vortex in the flask and after a full seven days no gel had been formed, i. e., to all intents and purposes, basic aluminum laurate does not gel test solvent at ambient temperature at concentrations of as much as 4%.

In view of the inability of basic aluminum laurate to gel test solvent in a week's time, it is remarkable that a

TABLE 3
Performance of coprecipitated aluminum soaps of 2-ethylhexanoic acid and lauric acid in Standard Test Solvent
[At 77° F.]

|  | 100% 2-Ethylhexanoate, 0% Laurate | | 80% 2-Ethylhexanoate, 20% Laurate | | 50% 2-Ethylhexanoate, 50% Laurate | | 20% 2-Ethylhexanoate, 80% Laurate | |
|---|---|---|---|---|---|---|---|---|
| Exposure to 80% Relative Humidity at 80° F., hrs | 0 | ¼ | 0 | ¼ | 0 | ¼ | 0 | ¼ |
| Moisture in soap, percent by wt | 0.5 | 0.9 | 0.7 | 1.6 | 0.8 | 2.0 | 0.7 | 1.6 |
| 2% Gels: | | | | | | | | |
| Vortex Time, min | >120 | >120 | 175 | 98 | 60 | 15 | 27 | 19 |
| Gardner Load, g./100 sec.— | | | | | | | | |
| at 24 hrs | (a) | (a) | 225 | 235 | 110 | (a) | 20 | (a) |
| at 168 hrs | 115 | 105 | 200 | 165 | 30 | (a) | (a) | (a) |
| 4% Gels: | | | | | | | | |
| Vortex Time, min | 14 | 15 | 65 | 27 | 42 | 6.8 | 8.0 | 5.9 |
| Gardner Load, g./100 sec.— | | | | | | | | |
| at 24 hrs | 270 | 320 | 480 | 490 | 400 | 165 | 330 | 84 |
| at 168 hrs | 410 | 430 | 465 | 420 | 350 | 95 | 225 | 43 | a Too thin to measure.

soap containing 80% of laurate radicals and 20% of 2-ethylhexanoate radicals had a Vortex Time of only 27 minutes at a 2% concentration when 2-ethylhexanoate agent alone has a Vortex Time at 2% concentration in excess of 120 minutes. Even at a 4% concentration, the agent containing 80% of laurate radicals had a Vortex Time of approximately one-half that of pure 2-ethylhexanoate agent.

In Table 4 there are presented comparative data between basic aluminum 2-ethylhexanoate alone and an equimolar mixture of 2-ethylhexanoate radicals and pelargonate radicals as the basic aluminum soap in test solvent at 77° F. The basic aluminum pelargonate soap behaves like the basic aluminum laurate soap in that there is no detectable amount of gel structure formed after seven days in the Vortex Time technique. It is unexpected that this gelling agent containing radicals of different carbon structure should, at 2% concentration, lower the time necessary for forming gelled test solvent below that required for basic aluminum 2-ethylhexanoate alone, and moreover, the gel formed at 2% concentration by the mixed radicals has a measureable consistency 24 hours after forming the gel. This was not true when basic aluminum 2-ethylhexanoate was used alone.

In general, the effect of subjecting basic aluminum alkanoate gelling agents to humidified air is a modification of the properties of the gels produced from the gelling agent after such exposure. Thus, the Vortex Time is reduced, i. e., the gelation rate is increased by such exposure and in general the consistency of the gel produced from the exposed gelling agent is lower as measured by the Gardner Load. Exposure of the gelling agent to moist air also has the effect of reducing the stability of the gelled hydrocarbon with respect to retained consistency of the gelled hydrocarbon over an extended period of time. The overall effect is less marked as the concentration of the gelling agent used in gelling the hydrocarbon is increased.

TABLE 4
Performance of coprecipitated basic aluminum 2-ethylhexanoate and basic aluminum pelargonate
[In Standard Test Solvent at 77° F.]

|  | Coprecipitated 50 Mol percent–50 Mol percent | | Basic Aluminum, 2-Ethylhexanoate | |
|---|---|---|---|---|
| Exposure to 80% Relative Humidity at 80° F., hrs | 1 | ¼ | 0 | ¼ |
| Moisture in Soap, percent by wt | 0.8 | 2.0 | 0.5 | 0.9 |
| At 2%: | | | | |
| Vortex Time, min | 95 | 29 | >120 | >120 |
| Gardner Load, g./100 sec.— | | | | |
| at 24 hrs | 210 | 140 | (a) | (a) |
| at 168 hrs | 150 | 68 | 115 | 105 |
| At 4%: | | | | |
| Vortex Time, min | 43 | 7.8 | 14 | 15 |
| Gardner Load, g./100 sec.— | | | | |
| at 24 hrs | 595 | 360 | 270 | 320 |
| at 168 hrs | 570 | 300 | 410 | 430 | a Too thin to measure.

Gelling agents containing 2-ethylhexanoate radicals and straight chain alkanoate radicals, such as pelargonate radicals and laurate radicals, are used preferably at concentrations of about 3% by weight to about 6% by weight in gasolines boiling range hydrocarbons to obtain material suitable for incendiary bombs. More specifically a gelling agent blend containing about equal amounts of the 2-ethylhexanoate radicals and pelargonate radicals is used at 3% by weight for the production of gelled gasoline suitable for incendiary bombs.

The mole percent of branched chain alkanoate radicals having a number of carbon atoms per branched chain alkanoate radical greater than eight, in association with saturated straight chain alkanoate radicals having more than 8 carbon atoms per straight chain alkannoate radical in gelling agents, should be preferably from about 50 mol percent to about 95 mol percent, for example, about 80 mol percent to 95 mol percent based on the total mixed alkanoate radicals in the gelling agent. Such gelling agents should be used in concentrations within the range of from about 4% by weight to about 10% by weight of the mixture of hydrocarbons used for the production of incendiary material.

AGENTS CONTAINING 3,5,5-TRIMETHYLHEXANOATE RADICALS

Tests were carried out on basic aluminum soaps containing only 3,5,5-trimethylhexanoate radicals and mixtures of this radical with caprylate radicals, pelargonate radicals and laurate radicals, respectively. The 3,5,5-trimethylhexanoic acid was obtained by the caustic oxidation of 3,5,5-trimethylhexanol of relatively high purity. The alcohol had a constant boiling point of 381° F. at 760 mm. and a refractive index of 1.4320 $n_D^{20}$. The physical properties of the purified 3,5,5-trimethylhexanoic acid obtained by distillation of the crude acid sprung from the sodium soap product of the sodium hydroxide oxidized alcohol is shown below:

Boiling range, ° F.—256–263 (11 to 12 mm.)
Sp. Gr. at 60° F.—0.9039
Refractive index, $n_D^{20}$—1.4300
Mol weight—158

The basic aluminum soaps containing 3,5,5-trimethylhexanoate radicals were prepared by the coprecipitation methods previously described.

Data on the gelling effectiveness of basic aluminum soaps containing equimolar amounts of 3,5,5-trimethylhexanoate radicals and straight chain alkanoate radicals are set out in Table 5. The basic aluminum 3,5,5-trimethylhexanoate was unable to develop any detectable gel structure at a concentration of 4% in test solvent after a week's time at 77° F.

As indicated above, basic aluminum soaps containing as alkanoate radicals only 3,5,5-trimethylhexanoate radicals or pelargonate radicals or laurate radicals are not gelling agents. We have discovered that the combination of either one of these straight chain alkanoate radicals with the branched chain radical results in an effective gelling agent.

The combination of 3,5,5-trimethylhexanoate radicals with caprylate radicals in a basic aluminum soap unexpectedly produces at concentrations of 2% of such soap gels of high consistency. This favorable effect with respect to consistency is accompanied by a phenomenal decrease in the Vortex Time with respect to the basic aluminum caprylate agent alone.

AGENTS CONTAINING ISOALKANOATE RADICALS

A preferred source of the branched chain alkanoate radicals is a mixture of aldehydes and alcohols derived by oxoation of monoolefin polymers containing 7 to 12 carbon atoms. These olefin polymers are obtained by the copolymerization or homopolymerization of a mixture of olefins containing 3 and/or 4 carbon atoms in order to obtain a higher molecular weight product containing a mixture of isomers. The mixture of aldehydes and alcohols produced as the raw product in oxoation may be oxidized, by various methods, to acids containing from 8 to 13 carbon atoms. Preferably the raw product is distilled to obtain a fraction wherein each component contains about the same number of carbon atoms. It is preferred to operate with alcohols obtained by hydrogenation of a distilled mixture of aldehydes and alcohols. These isomeric alcohols are redistilled to obtain a close boiling product fraction, which fraction is oxidized to the corresponding alkali metal soaps by treatment with caustic at temperatures between about 600° F. and 725° F. The acids are sprung by treating the alkali metal soap with a mineral acid. The alkali metal soap itself may be used in the preparation of the gelling agent.

There is available commercially a mixture of isomeric octyl alcohols (octanols) which has been prepared by the oxoation by a mixture of $C_7$ olefins, which olefins have been obtained by the copolymerization of propylene and a mixture of butenes. This mixture, of oxo, isomeric octanols is sold commercially under the name "Isooctyl alcohol." Herein, a mixture of oxo, isomeric alcohols is designated as isoalkanols and these have from 8 to 13 carbon atoms. The alkanoate radicals obtained by oxidation of these isoalkanols are hereinafter designated as isoalkanoate radicals. (It is to be understood that these isoalkanoate radicals are mixtures of branched chain alkanoates having from 8 to 13 carbon atoms.) For example, the branched chain octanoate radicals obtained by the oxidation of "isooctyl alcohol" are designated herein as "isooctanoate radicals"; and the alkali metal soaps containing these radicals are designated "alkali metal isooctanoates."

The probable degree of branching which exists in alkanoic acids derived from oxo alcohols has been determined by a combination of experimental and theoretical analyses. These alcohols containing from 8 to 13 carbon atoms were derived from olefin polymers obtained from propylene polymerization, polymerization of propylene and mixed butylenes and polymerization of mixed butylenes. With the exception of the isooctanoic acid, all of the acids contain a methyl branch in each molecule; about 95% of the isooctanoic molecules contain a methyl branch. The number of molecules containing an ethyl branch varies from about 3% to about 15%, dependent on the olefin polymer oxoated. Propyl branches are present only in acids derived from propylene polymer; about 9% of the molecules contain a propyl branch. The average number of branches per molecule ranges from about 1.6 to about 4.5, the number of branches increasing with increase in number of carbon atoms in the molecule. The isoalkanoic acids contain from 5 to 10 carbon atoms in the longest straight carbon chain.

The isooctanoate radicals utilized in the following experiments were obtained by the oxoation of a polymer derived from a mixture of propylene and butylenes, in which isobutylene represented about 15% of the butylene fraction. The eight-carbon-atom, alcohol-product contained about 61% of dimethylhexanols, about 27% of methylheptanols, about 6% of ethylmethylpentanols, and about 6% of ethylhexanols. Thus, these isooctanols contain from 5 to 7 carbon atoms in the longest straight chain.

A detailed explanation of the method of procedure in determining the branching of isoalkanoate radicals containing from 8 to 13 carbon atoms and the isooctyl alcohol is set out in our copending application Serial No. 436,355, filed June 14, 1954, page 8, line 17 through page 12, line 9, and page 15 through page 21. The statements made herein with respect to isoalkanols and isoalkanoate radicals are a summary of the detailed material presented in our copending application.

The isotridecanoate radicals were derived by caustic oxidation of isotridecanols, which isotridecanols had been prepared by oxoation of propylene tetramer isomers.

The sodium isoctanoates used in the preparation of basic aluminum isooctanoate and in the formation of gelling agents containing both isooctanoate radicals and straight chain radicals were obtained as follows:

A solution of 74.0 weight percent of rayon grade sodium hydroxide was preheated and pumped at an average rate of 4.5 pounds per hour into the bottom of a cylindrical reaction vessel at about 685° F. The reaction vessel was fitted with a stirrer and baffles to provide agitation. An Oxo process isoctanal mixture (B. P. 181° C.– 192.5° C., $n_D^{20}$ 1.4305, Sp. Gr. 0.833), i. e. a mixture of isooctanols preheated to about 685° F., was pumped into the bottom of the reactor through a separate inlet at an average rate of 9.3 pounds per hour, reactor temperature being maintained at about 720° F. Oxidation of the alcohol took place with evolution of hydrogen at the rate

TABLE 5

*Performance of branched chain—straight chain basic aluminum alkanoates*

[In test solvent at 77° F.]

| Components (50 mol percent–50 mol percent) | Concentration, percent | Moisture, percent | | Vortex Time, min. | | Gardner Load, g./100 sec. | | | |
|---|---|---|---|---|---|---|---|---|---|
| | | | | | | At 24 hrs. | | At 168 hrs. | |
| | | 0 hrs.[a] | ¼ hr.[a] | 0 hrs.[a] | ¼ hr.[a] | 0 hrs.[a] | ¼ hr.[a] | 0 hrs.[a] | ¼ hrs.[a] |
| 3,5,5-trimethylhexanoate-caprylate | 2 | 0.8 | 1.6 | 4.3 | 2.7 | 175 | [b] | 140 | [b] |
| Do | 4 | 0.8 | 1.6 | 0.5 | 0.5 | 460 | 265 | 430 | 280 |
| 3,5,5-trimethylhexanoate-pelargonate | 2 | 0.8 | 1.6 | 165 | 140 | 215 | 195 | 110 | 160 |
| Do | 4 | 0.8 | 1.6 | 79 | 21 | 590 | 450 | 545 | 430 |
| 3,5,5-trimethylhexanoate-laurate | 2 | 0.4 | 1.6 | 8.4 | 5.2 | 95 | [b] | 26 | [b] |
| Do | 4 | 0.4 | 1.6 | 1.8 | 1.4 | 335 | 80 | 320 | 74 |

[a] Exposure of gelling agent to relative humidity of 80% at 80° F.
[b] Too thin to measure.

of 55 cu. ft. per hour (measured at standard conditions of pressure and temperature). This gas was vented at such a rate as to maintain a pressure of about 210 p. s. i. g. on the reactor and solution vessel. The mixture of isomeric octanoates, excess sodium hydroxide and trace of unreacted alcohol passed through an overflow line at the top of the reactor into a solution vessel held at a temperature of about 410° F. where water was added at the rate of 29 pounds per hour to dissolve the soap and excess caustic. Unreacted isooctanols were flashed off with steam from the top of the solution vessel to a separator where it was recovered at the rate of about 0.3 pound per hour. Over a 24-hour period, 194.8 pounds of isooctanol were fed to the reactor and there was recovered sodium isooctanoate soap equivalent to 187.9 pounds of isooctanols, thus corresponding to a yield of 96.2 percent, along with 6.9 pounds of unconverted isooctanols. An aqueous soap solution was withdrawn from the bottom of the solution vessel and cooled. This solution had an average analysis corresponding to the following:

|                     | Weight percent |
|---------------------|----------------|
| Sodium isooctanoate | 45.8           |
| Water               | 51.7           |
| Sodium hydroxide    | 0.2            |
| Sodium carbonate    | 0.5            |
| Free isooctanol     | Trace          |
| Total               | 100.0          |

The preparation of a representative basic aluminum alkanoate gelling agent containing branched chain radicals and straight chain radicals according to our invention was described above in the preparation of basic aluminum octanoate soap containing 50% 2-ethylhexanoate radicals and 50% caprylate radicals.

In our preferred procedure, the precipitated basic aluminum soap is dehydrated until the moisture content is between about 1.0 and 1.3%. This is accomplished by heating at a temperature of about 140° F. for about 18 hours. The so-dried soap is then ground to suitable particle size and during the grinding operation the moisture content is further reduced to about 0.6 to 1.0%. Following the initial drying step and the grinding operation, the finely divided soap is heated again and at a substantially higher temperature, e. g., for a period of about 3 hours at a temperature of about 210° F., during which period the moisture content of the soap is reduced to about 0.2 to 0.5%. However, washed precipitated soaps may be rough ground to about 4 mesh size particles and subjected to further drying at temperatures below about 220° F. to reduce the moisture content to less than about 0.6% in a single drying step and then the soap is ground to pass through a #40 U. S. Standard sieve, preferably a major portion of the dried agent to pass through a #100 U. S. Standard sieve.

Basic aluminum soaps containing both isooctanoate radicals and caprylate or pelargonate or laurate radicals and the soaps containing isotridecanoate radicals and the respective straight chain radicals were prepared by coprecipitation method and dried according to the procedure given above for basic aluminum isooctanoate. There are presented in Table 6 data on agents containing various proportions of isooctanoate radicals and caprylate radicals. The data indicate that the introduction of isooctanoate radicals to the gelation mixture containing the caprylate radicals increases the gelation rate as measured by the Vortex Time. The data also indicate that greater stability of the gelled hydrocarbon can be expected if concentrations of the gelling agent greater than 2% by weight of the hydrocarbons are used.

The performance of gelling agents containing isooctanoate and isotridecanoate radicals along with pelargonate radicals, and with laurate radicals is shown in Table 7. The data show that the mixture of branched chain alkanoate radicals designated as isooctanoate radicals and isotridecanoate radicals respectively form effective gelling agents when admixed with pelargonate radicals or laurate radicals in a basic aluminum soap. The data indicate that the maximum percent of straight chain laurate radicals should preferably not exceed 50% and more preferably the range should be from about 5% to about 20% of the total alkanoate radicals in the gelling agent.

NAPALM AGENT

For purposes of comparison, the gelling characteristics of test solvent containing commercial Napalm gelling agent are set out in Table 8. These data show that at 4% concentration the stability of the Napalm gel is poorer than that of virtually all of the gels obtained with agent of this invention. Further the stabilities of gels made with Napalm which has been exposed to high humidity were no better or poorer than that of most of the 4% gels using the agent of the invention. The data in Table 8 in comparison with the data using our gelling agent indicate that higher concentrations of Napalm are required to obtain gelled hydrocarbons satisfactory with respect to consistency.

TABLE 6

*Performance of coprecipitated aluminum soaps of isooctanoic acid and caprylic acid in standard test solvent*

[At 77° F.]

|  | 100% Isooctanoate, 0% Caprylate | | 80% Isooctanoate, 20% Caprylate | | 50% Isooctanoate, 50% Caprylate | | 20% Isooctanoate, 80% Caprylate | | 0% Isooctanoate, 100% Caprylate | |
|---|---|---|---|---|---|---|---|---|---|---|
| Exposure to 80% Relative Humidity at 80° F., hrs | 0 | 1/4 | 0 | 1/4 | 0 | 1/4 | 0 | 1/4 | 0 | 1/4 |
| Moisture in soap, percent by wt | 0.9 | 1.6 | 0.8 | 1.5 | 0.6 | 1.6 | 0.4 | 1.5 | 0.4 | 1.3 |
| 2% Gels: | | | | | | | | | | |
| Vortex Time, min | 20.0 | 4.8 | 12 | 8.6 | 21 | 14 | 6.4 | 9.2 | 30 | 29 |
| Gardner Load, g/100 sec.— | | | | | | | | | | |
| at 24 hrs | 180 | 155 | 215 | 105 | 150 | 25 | 55 | (a) | 50 | (a) |
| at 168 hrs | 185 | 145 | 180 | 50 | 105 | (a) | 25 | (a) | (a) | (a) |
| 4% Gels: | | | | | | | | | | |
| Vortex Time, min | 6.3 | 1.3 | 1.3 | 1.4 | 5.6 | 3.9 | 2.9 | 2.5 | 2.0 | 4.1 |
| Gardner Load, g/100 sec.— | | | | | | | | | | |
| at 24 hrs | 515 | 415 | 415 | 320 | 450 | 370 | 325 | 350 | 480 | 335 |
| at 168 hrs |  | 510 | 450 | 380 | 470 | 450 | 320 | 340 | 445 | 295 |

*Too thin to measure.

TABLE 7
Performance of branched chain—straight chain basic aluminum alkanoates
[In test solvent at 77° F.]

| Components (50 mol percent-50 mol percent) | Concentration, percent | Moisture, percent | | Vortex Time, min. | | Gardner Load, g/100 sec. | | | |
|---|---|---|---|---|---|---|---|---|---|
| | | | | | | At 24 hrs. | | At 168 hrs. | |
| | | 0 hrs.a | ¼ hr.a | 0 hrs.a | ¼ hr.a | 0 hrs.a | ¼ hr.a | 0 hrs.a | ¼ hr.a |
| Isooctanoate-pelargonate | 2 | 0.8 | 1.6 | 21.1 | 12 | 66 | (b) | 30 | (b) |
| Do | 4 | 0.8 | 1.6 | 9.6 | 4.7 | 470 | 265 | 390 | 265 |
| Isooctanoate-laurate | 2 | 0.6 | 1.7 | 11.7 | 10.4 | 59 | (b) | (b)(c) | (b)(c) |
| Do | 4 | 0.6 | 1.7 | 1.9 | 2.5 | 425 | 110 | c 390 | c 75 |
| Isotridecanoate-caprylate | 2 | 0.4 | 1.7 | 30 | 15 | 140 | (b) | 53 | (b) |
| Do | 4 | 0.4 | 1.7 | 14 | 6.0 | 410 | 120 | 380 | 70 |
| Isotridecanoate-pelargonate | 2 | 1.0 | 2.0 | 31 | 13 | 83 | (b) | 66 | (b) |
| Do | 4 | 1.0 | 2.0 | 13 | 4.9 | 350 | 225 | 350 | 160 |
| Isotridecanoate-laurate | 2 | 0.6 | 1.3 | 4.9 | 6.6 | 31 | (b) | (b) | (b) |
| Do | 4 | 0.6 | 1.3 | 1.6 | 1.9 | 140 | 51 | 105 | 38 |
| Do | 6 | 0.6 | 1.3 | 0.8 | 0.9 | 315 | 155 | 260 | 130 | a Exposure of gelling agent to relative humidity of 80% at 80° F.
b Too thin to measure.
c Gardner Load at 264 hours.

TABLE 8
Performance of napalm in standard test solvent at 77° F.

| Exposure to 80% Relative Humidity at 80° F., hrs | 0 | ¼ |
|---|---|---|
| Moisture in Soap, percent by wt | 0.7 | 1.5 |
| At 4%: | | |
| Vortex Time, min | 2.9 | 2.4 |
| Gardner Load, g./100 sec.— | | |
| at 24 hrs | 185 | 85 |
| at 168 hrs | 205 | 50 |
| At 6%: | | |
| Vortex Time, min | 0.6 | 0.6 |
| Gardner Load, g./100 sec.— | | |
| at 24 hrs | 405 | 320 |
| at 168 hrs | 485 | 260 |

Several advantages result from the use of gelling agents containing branched chain and saturated straight chain alkanoate radicals. These advantages may be classified as those which are inherent in the gels produced therefrom and economic advantages. In general, the mixed radical gelling agents of this invention show higher gelation rates than gelling agents prepared from branched chain alkanoates or straight chain alkanoates unmixed one with the other. Closely related to this advantage is that of making useful, as gelling agent intermediates, straight chain saturated fatty acids, those having 8 to 13 carbon atoms per alkanoate radical. Heretofore, these have not been used primarily because their basic aluminum salts are not, per se, gelling agents. Thus, we have found that these acids can be used to provide alkanoate radicals for association with branched chain radicals in basic aluminum soaps, which soaps are excellent gelling agents for hydrocarbons, the gels therefrom finding utility as military incendiaries or as hydraulic fracturing media for producing channels in earth formations.

Having thus described our invention, we claim:

1. A composition effective for gelling hydrocarbons boiling in the range of 100 to 600° F. when employed in amounts in the range of about 2 to 10 per cent by weight, which composition consists essentially of basic aluminum alkanoates having two alkanoate radicals and one hydroxy radical per aluminum atom, about 5 to 70 per cent of the total alkanoate radicals being normal straight chain radicals containing 8 to 9 carbon atoms and the remainder of the alkanoate radicals being branched chain alkanoate radicals containing 8 to 9 carbon atoms, the branches thereon being selected from the class consisting of methyl and ethyl, said composition having been dried to a moisture content less than about 1.3 per cent and ground to pass a No. 40 U. S. Standard sieve.

2. The composition of claim 1 which contains about 1 to 5 per cent of an aerogel anti-agglomerating agent.

3. The composition of claim 1 wherein the branched chain alkanoate radicals are isooctanoate radicals.

4. The composition of claim 1 wherein said branched chain alkanoate radicals are 2-ethyl hexanoate radicals.

5. The composition of claim 4 wherein about 20 to about 70 per cent of the total alkanoate radicals are caprylate radicals and from about 80 to 30 per cent of the total alkanoate radicals are 2-ethyl hexanoate radicals.

6. The composition of claim 1 wherein at least about 50 per cent of the total radicals are branched chain radicals.

7. The composition of claim 1 wherein said branched chain alkanoate radicals are 3,5,5-trimethyl hexanoate radicals.

8. The composition of claim 1 wherein the straight chain alkanoate radicals are caprylate radicals.

9. The composition of claim 1 wherein the straight chain alkanoate radicals are prelargonate radicals.

10. The composition of claim 1 wherein the straight chain radicals are caprylate radicals which are present to the extent of 5 to 50 per cent of the total radicals and the branched chain radicals are isooctanoate radicals.

References Cited in the file of this patent
UNITED STATES PATENTS

| 2,390,609 | Minich | Dec. 11, 1945 |
| 2,417,071 | Gebhart et al. | Mar. 11, 1947 |
| 2,618,536 | Hunn | Nov. 18, 1952 |
| 2,628,202 | Allison et al. | Feb. 10, 1953 |
| 2,648,694 | Mason | Aug. 11, 1953 |